US011202046B2

United States Patent
Katayama et al.

(10) Patent No.: US 11,202,046 B2
(45) Date of Patent: Dec. 14, 2021

(54) IMAGE PROCESSOR, IMAGING DEVICE, AND IMAGE PROCESSING SYSTEM

(71) Applicant: Sony Corporation, Tokyo (JP)

(72) Inventors: Hironobu Katayama, Kanagawa (JP); Shuji Uehara, Kanagawa (JP); Yoshinori Muramatsu, Kanagawa (JP); Tomohiro Yamazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 16/308,660

(22) PCT Filed: May 17, 2017

(86) PCT No.: PCT/JP2017/018538
§ 371 (c)(1),
(2) Date: Dec. 10, 2018

(87) PCT Pub. No.: WO2017/217177
PCT Pub. Date: Dec. 21, 2017

(65) Prior Publication Data
US 2019/0166345 A1 May 30, 2019

(30) Foreign Application Priority Data
Jun. 17, 2016 (JP) .............................. JP2016-120965

(51) Int. Cl.
*G06T 7/90* (2017.01)
*H04N 9/73* (2006.01)
(Continued)

(52) U.S. Cl.
CPC ............... *H04N 9/735* (2013.01); *G06T 7/11* (2017.01); *G06T 7/136* (2017.01); *G06T 7/20* (2013.01);
(Continued)

(58) Field of Classification Search
CPC .......... H04N 9/735; H04N 9/64; H04N 5/232; H04N 5/232061; H04N 7/185; H04N 7/18;
(Continued)

(56) References Cited

U.S. PATENT DOCUMENTS 5,475,507 A * 12/1995 Suzuki ...................... G06T 7/12
358/500
7,352,391 B1 4/2008 Hatakeyama
(Continued)

FOREIGN PATENT DOCUMENTS

CN 101086551 A 12/2007
CN 102651818 A 8/2012
(Continued)

OTHER PUBLICATIONS

Translated Version of JP2003259352 (Year: 2003).*
(Continued)

*Primary Examiner* — Carol Wang
(74) *Attorney, Agent, or Firm* — Wolf, Greenfield & Sacks, P.C.

(57) ABSTRACT

An image processor according to the present disclosure includes: a multiplier that receives image data from a pixel section including pixels of a plurality of colors and multiplies the image data by an adjustment parameter that adjusts a color level in each of the pixels; an adjuster that calculates a ratio of respective colors in each of the pixels in the image data and adjusts a value of the adjustment parameter on the basis of the ratio of the respective colors; and a binarization processor that extracts a target image of a specific color on the basis of the image data multiplied by the adjustment parameter.

5 Claims, 11 Drawing Sheets

(51) Int. Cl.

| | | |
|---|---|---|
| *G06T 7/20* | (2017.01) | |
| *H04N 7/18* | (2006.01) | |
| *G06T 7/11* | (2017.01) | |
| *G06T 7/136* | (2017.01) | |
| *H04N 9/64* | (2006.01) | |
| *H04N 5/232* | (2006.01) | |
| *H04N 9/04* | (2006.01) | |

(52) U.S. Cl.
CPC ............... *G06T 7/90* (2017.01); *H04N 5/232* (2013.01); *H04N 5/232061* (2018.08); *H04N 7/18* (2013.01); *H04N 7/185* (2013.01); *H04N 9/64* (2013.01); *G06T 2207/10016* (2013.01); *G06T 2207/10024* (2013.01); *G06T 2207/30261* (2013.01); *H04N 9/045* (2013.01)

(58) Field of Classification Search
CPC ... G06T 7/11; G06T 7/136; G06T 7/20; G06T 7/90; G06T 2207/10016; G06T 2207/10024; G06T 2207/30261
See application file for complete search history.

(56) References Cited

U.S. PATENT DOCUMENTS

| | | | | |
|---|---|---|---|---|
| 2002/0167596 | A1* | 11/2002 | Suzuki | H04N 9/735 |
| | | | | 348/223.1 |
| 2003/0043394 | A1* | 3/2003 | Kuwata | H04N 1/628 |
| | | | | 358/1.9 |
| 2007/0040845 | A1* | 2/2007 | Choo | G09G 5/02 |
| | | | | 345/589 |
| 2008/0304739 | A1* | 12/2008 | Sasaki | H04N 1/628 |
| | | | | 382/167 |
| 2009/0116070 | A1* | 5/2009 | Ichitani | H04N 1/6022 |
| | | | | 358/3.01 |
| 2009/0207462 | A1* | 8/2009 | Arimoto | H04N 1/62 |
| | | | | 358/509 |
| 2011/0149103 | A1* | 6/2011 | Hatakeyama | H04N 9/045 |
| | | | | 348/222.1 |
| 2011/0235945 | A1* | 9/2011 | Wakazono | G06T 5/40 |
| | | | | 382/300 |
| 2012/0218439 | A1 | 8/2012 | Ueda et al. | |
| 2016/0260388 | A1* | 9/2016 | Yata | G09G 3/3607 |

FOREIGN PATENT DOCUMENTS

| | | |
|---|---|---|
| CN | 102918845 A | 2/2013 |
| EP | 2493200 A1 | 8/2012 |
| JP | 01-173269 A | 7/1989 |
| JP | 07-086936 A | 3/1995 |
| JP | 09-298693 A | 11/1997 |
| JP | 2003-189129 A | 7/2003 |
| JP | 2003-259352 A | 9/2003 |
| JP | 2012-178788 A | 9/2012 |
| JP | 2015-115922 A | 6/2015 |

OTHER PUBLICATIONS

International Search Report and English translation thereof dated Aug. 1, 2017 in connection with International Application No. PCT/JP2017/018538.

Written Opinion and English translation thereof dated Aug. 1, 2017 in connection with International Application No. PCT/JP2017/018538.

International Preliminary Report on Patentability and English translation thereof dated Dec. 27, 2018 in connection with International Application No. PCT/JP2017/018538.

Chinese Office Action dated Jul. 15, 2020 in connection with Chinese Application No. 201780028141.6, and English translation thereof.

* cited by examiner

[ FIG. 1 ]
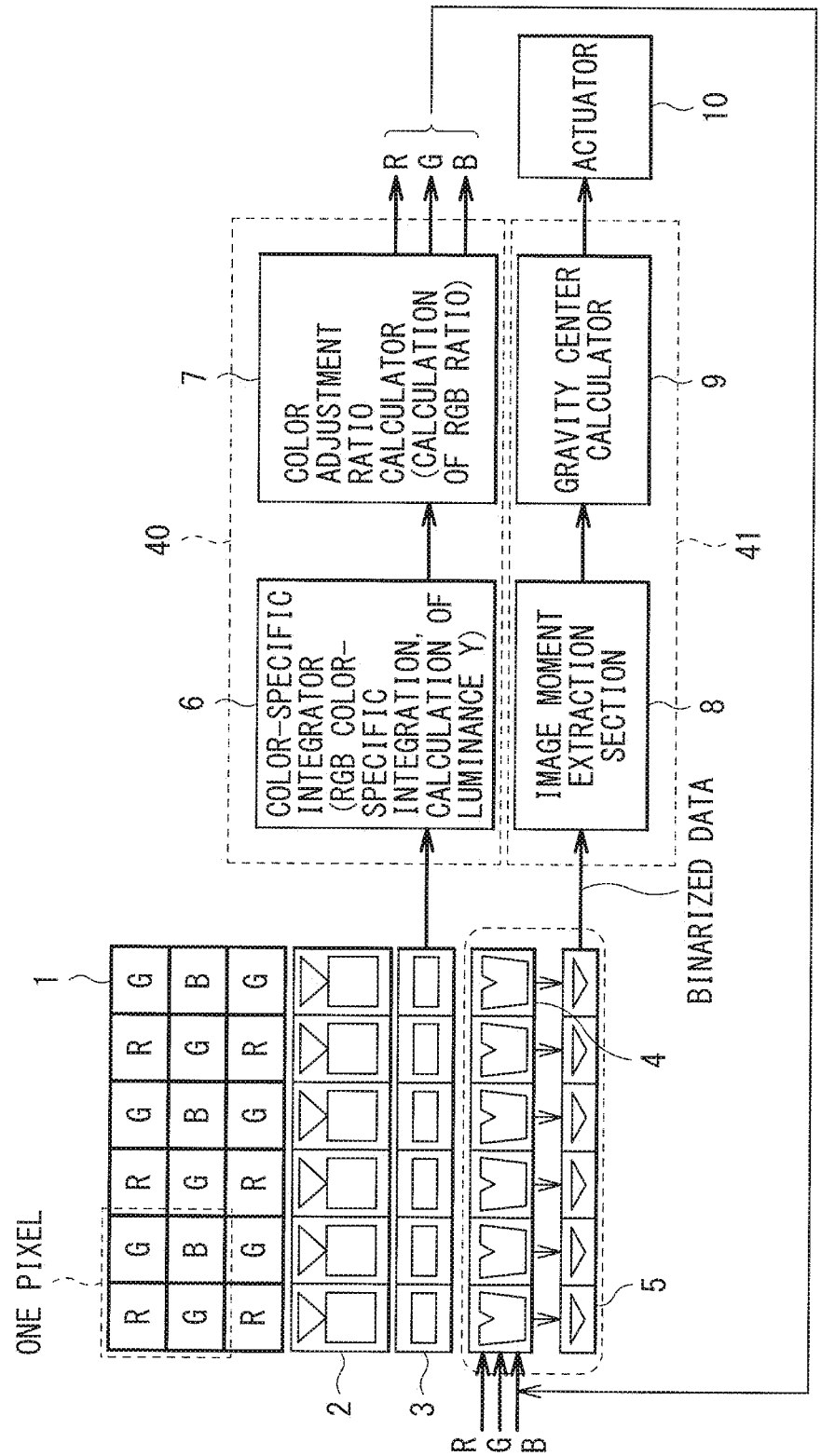

[ FIG. 2 ]
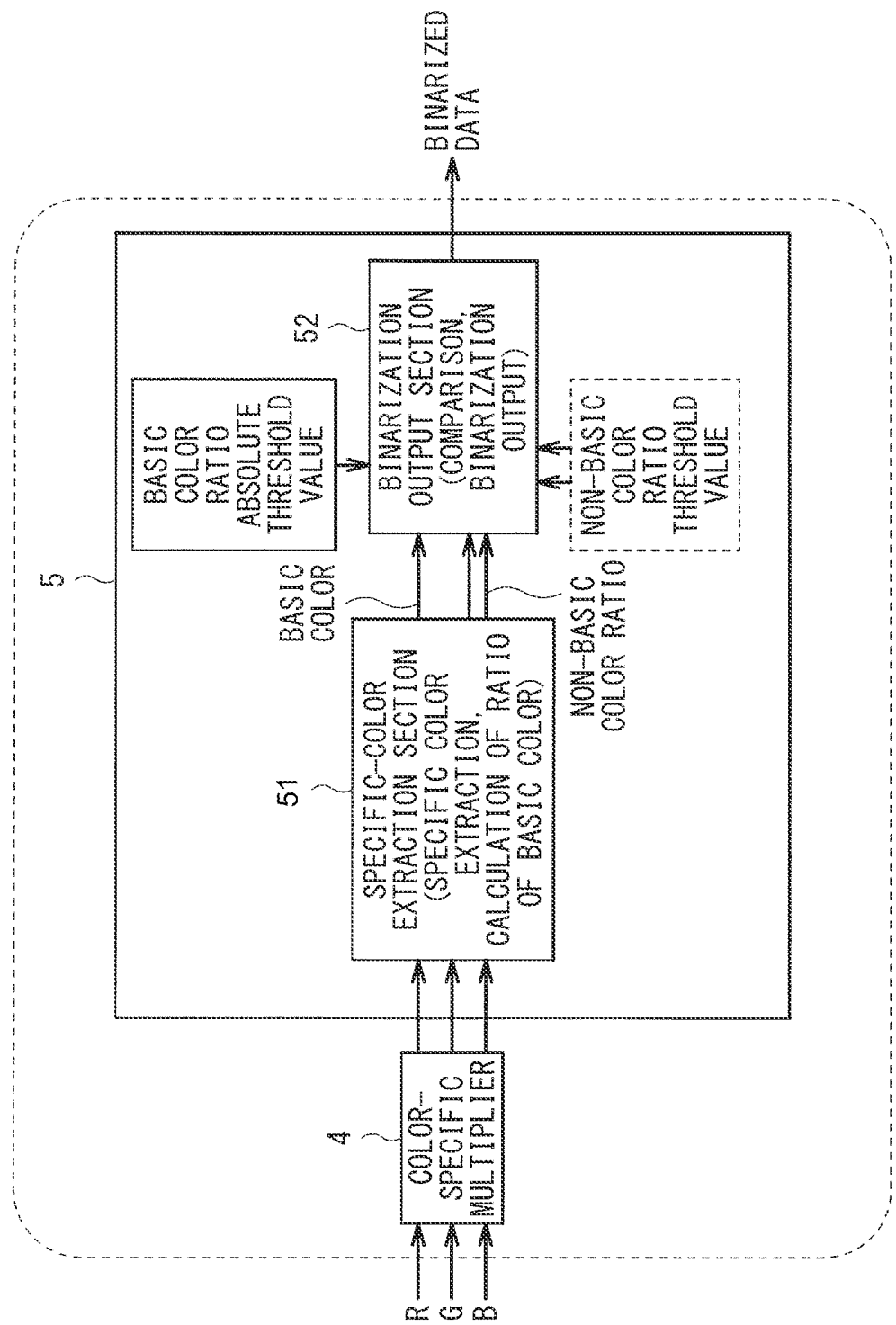

[FIG. 3]
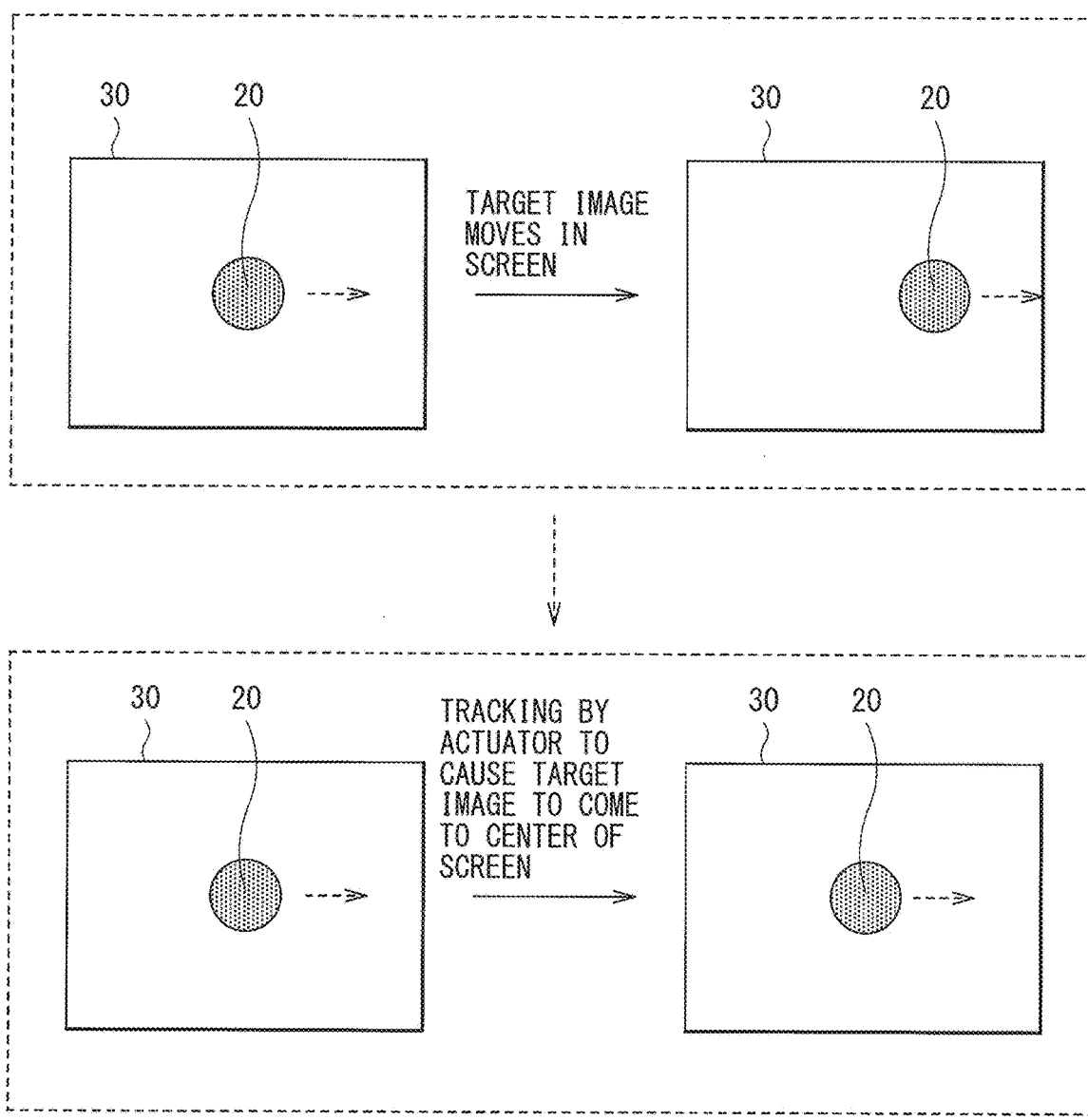

[FIG. 4]
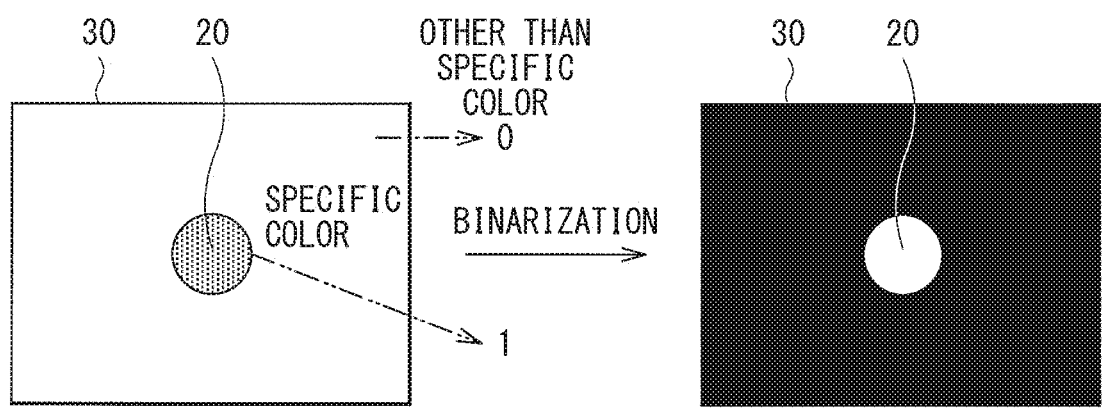

[FIG. 5]
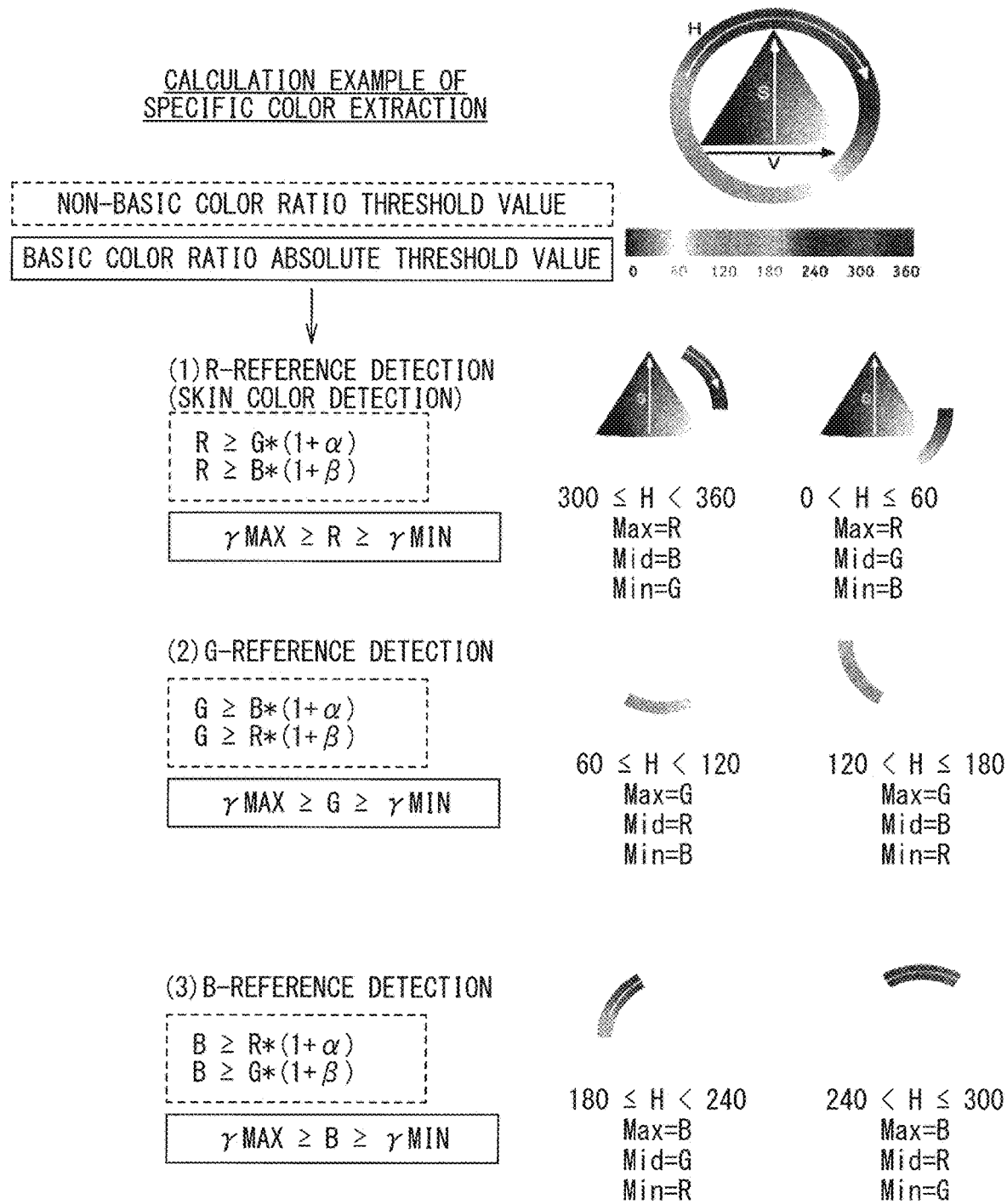

[FIG.6]
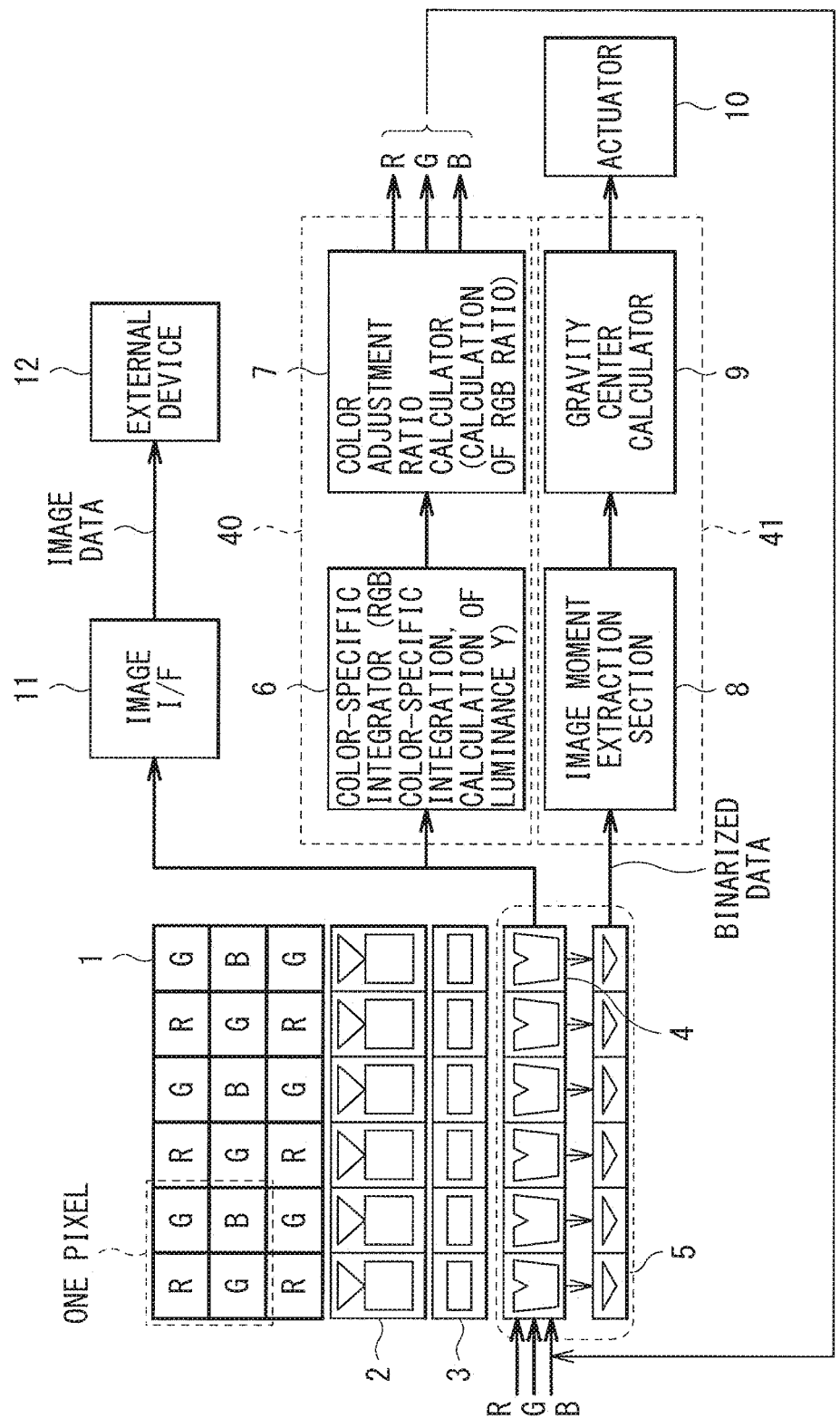

[FIG. 7]
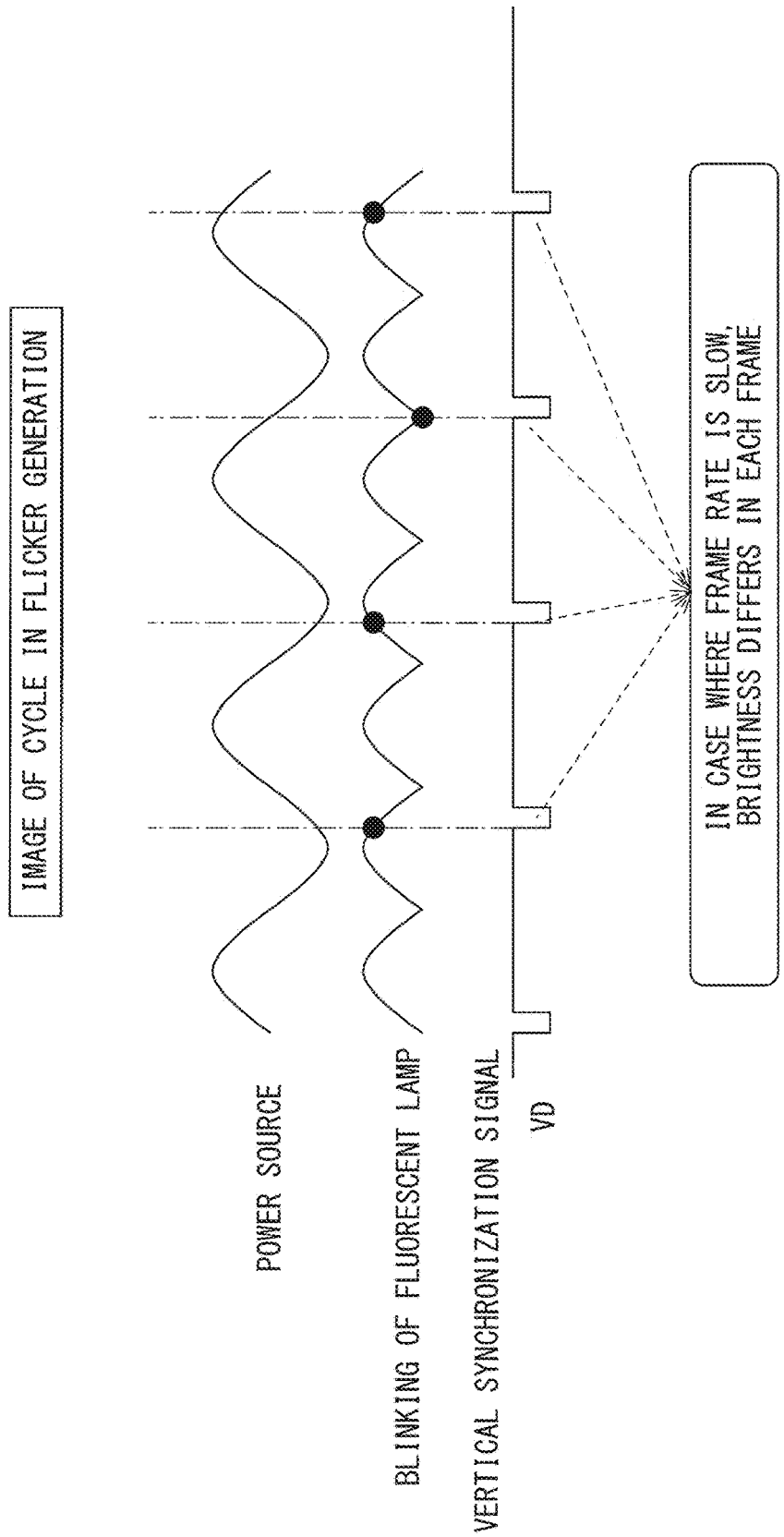

[FIG. 8]
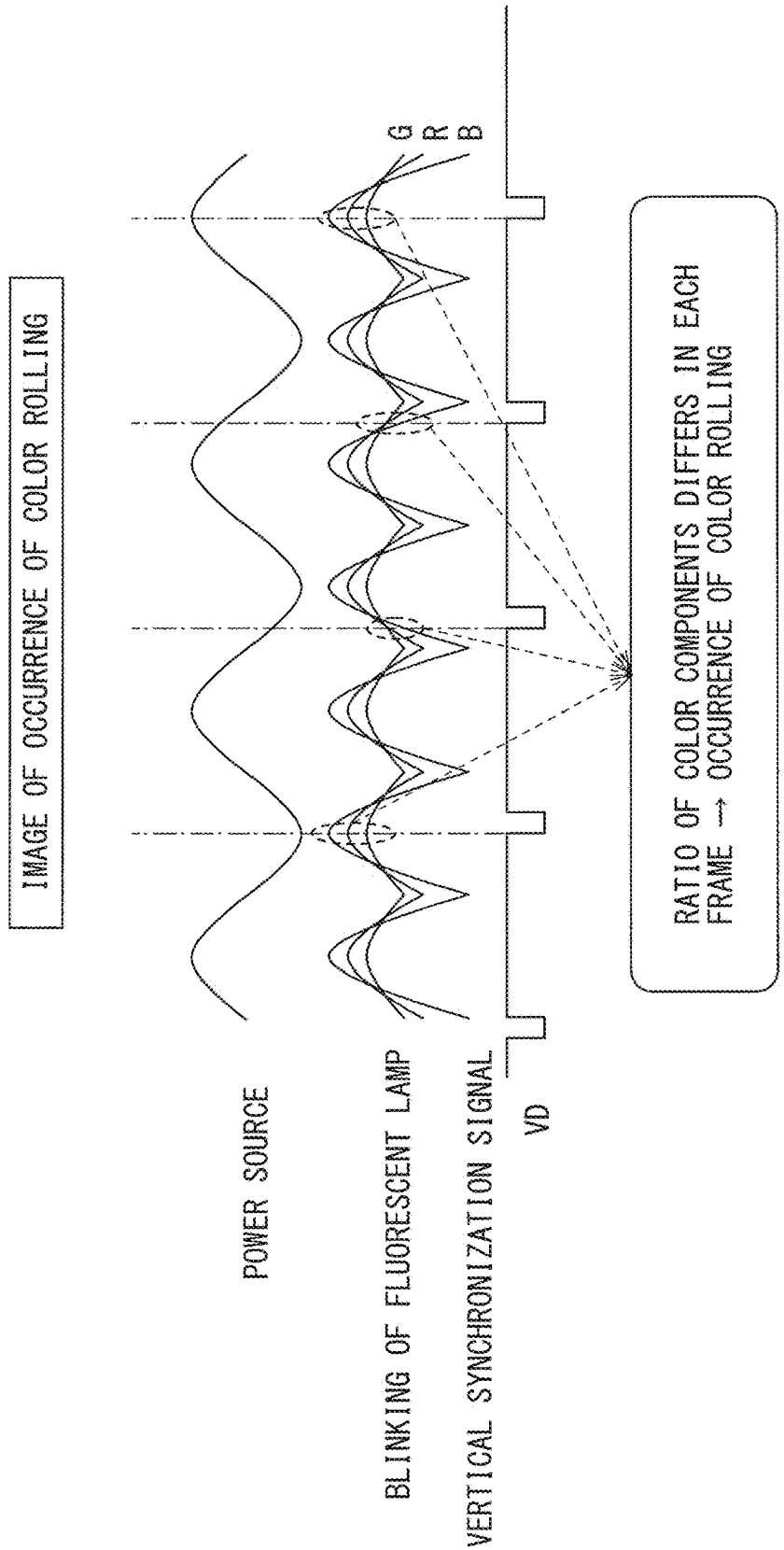

[FIG. 9]
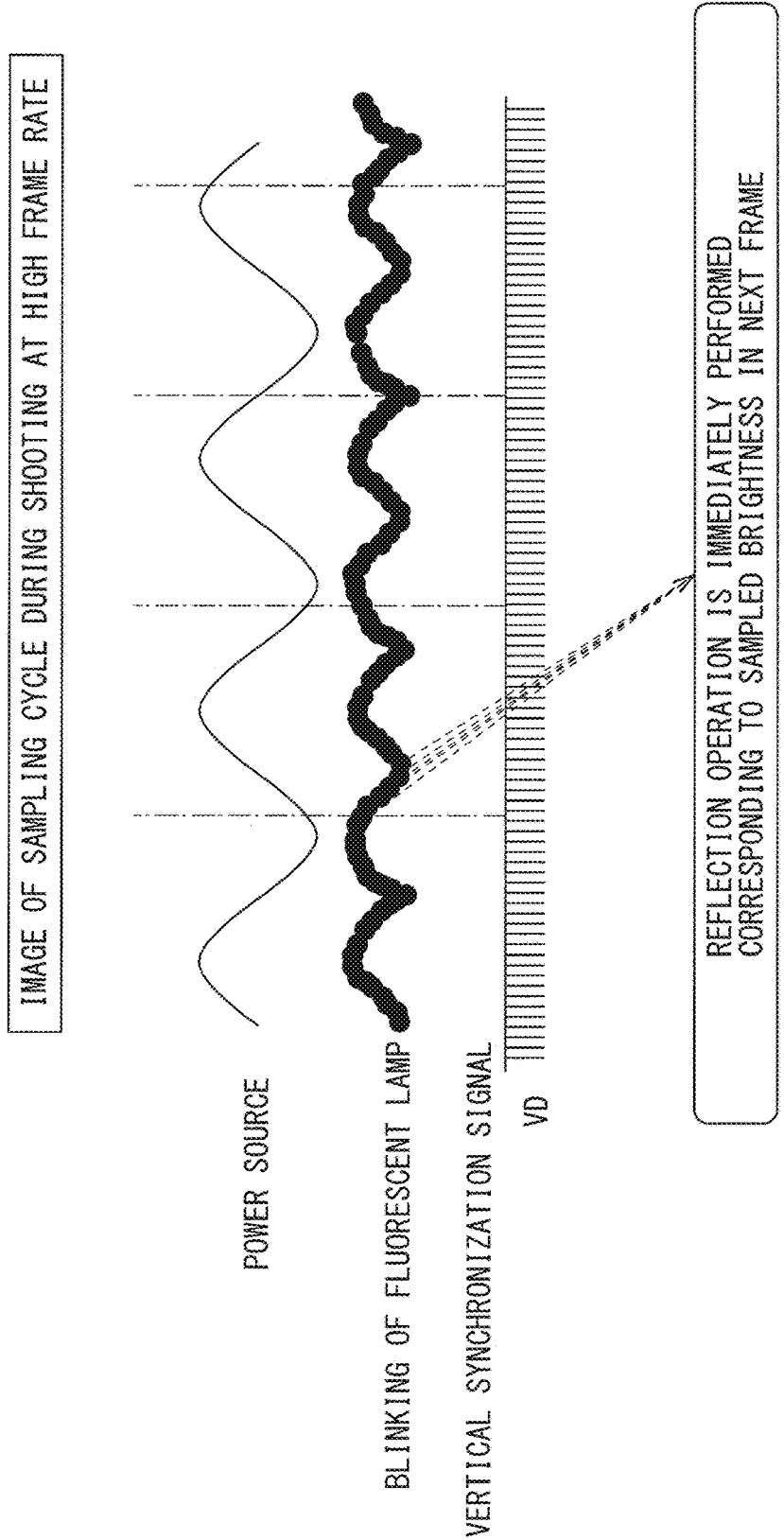

[ FIG. 10 ]
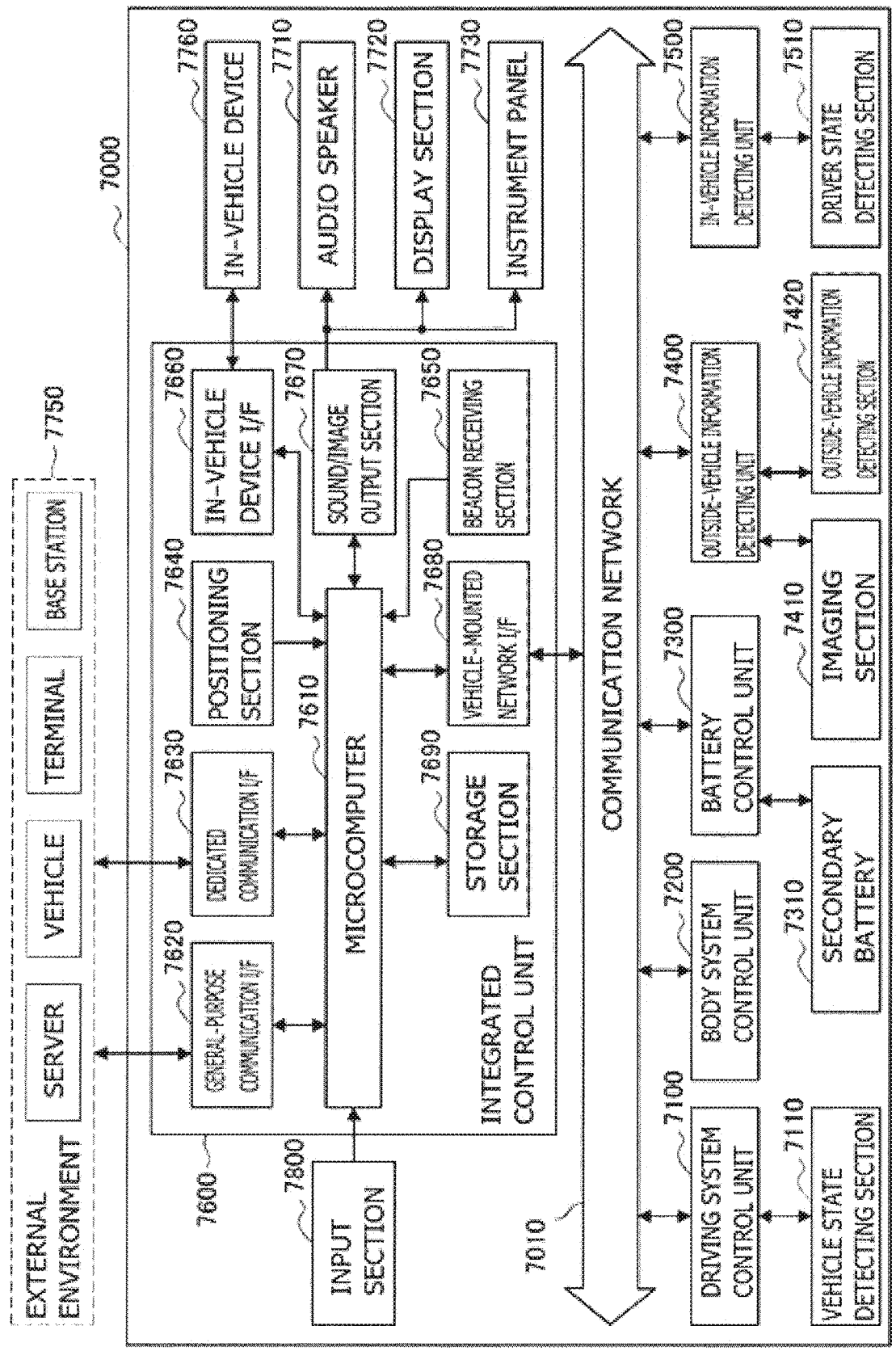

[ FIG. 11 ]
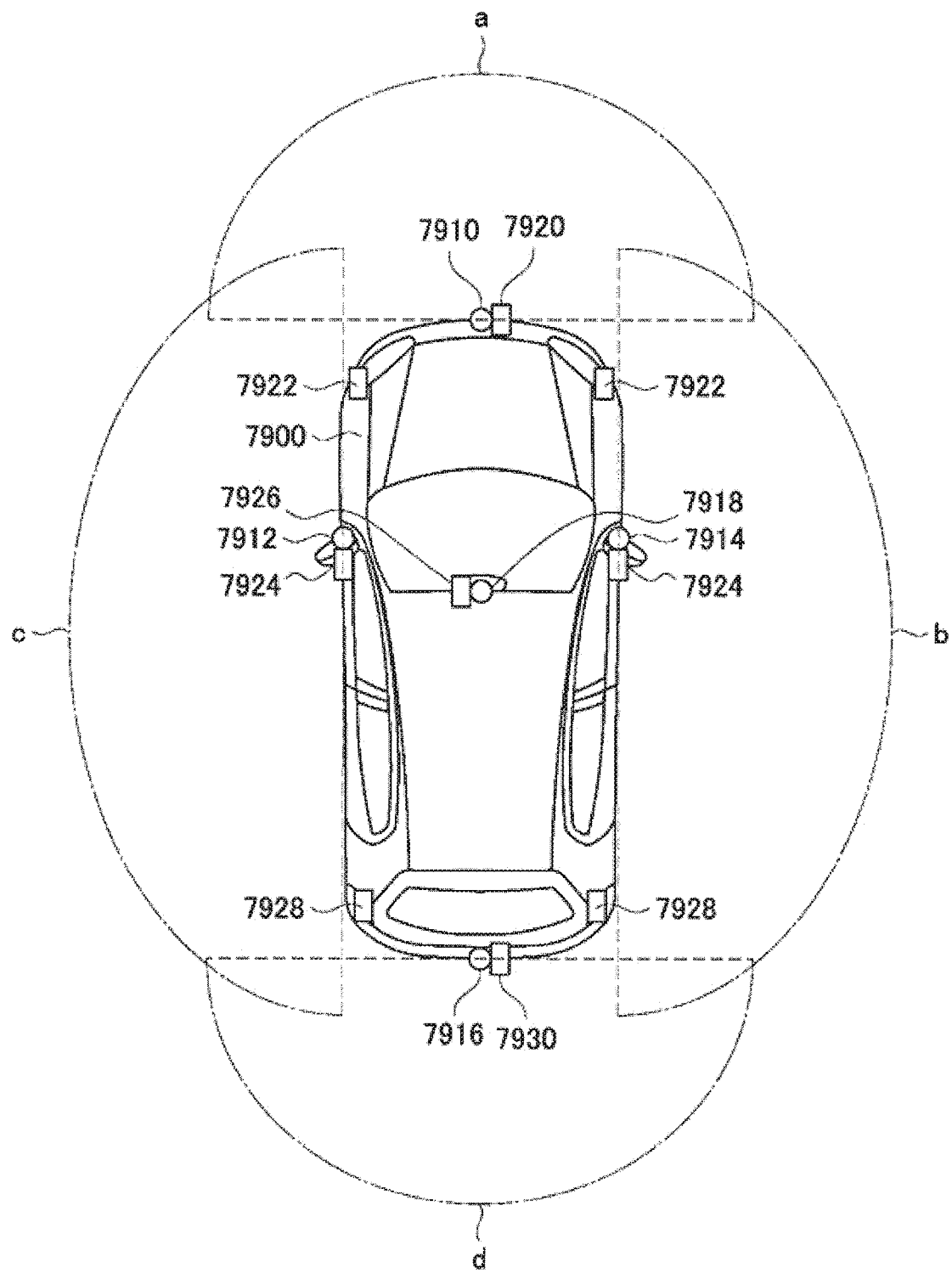

180
IMAGE PROCESSOR, IMAGING DEVICE, AND IMAGE PROCESSING SYSTEM

CROSS-REFERENCE TO RELATED APPLICATIONS

This application claims the benefit under 35 U.S.C. § 371 as a U.S. National Stage Entry of International Application No. PCT/JP2017/018538, filed in the Japanese Patent Office as a Receiving Office on May 17, 2017, which claims priority to Japanese Patent Application Number JP2016-120965, filed in the Japanese Patent Office on Jun. 17, 2016, each of which is hereby incorporated by reference in its entirety.

TECHNICAL FIELD

The present disclosure relates to an image processor, an imaging device, and an image processing system that are suitable for, for example, a target tracking system.

BACKGROUND ART

There is a target tracking system that tracks a moving object of a specific color as a target. In such a target tracking system, for example, image data from an imaging device is directly binarized with a threshold value as color information of RGB of a target to be tracked, and thus-binarized image data is summarized to estimate a position of the target.

CITATION LIST

Patent Literature

PTL 1: Japanese Unexamined Patent Application Publication No. H07-086936
PTL 2: Japanese Unexamined Patent Application Publication No. H01-173269
PTL 3: Japanese Unexamined Patent Application Publication No. 2003-189129
PTL 4: Japanese Unexamined Patent Application Publication No. 2015-115922

SUMMARY OF THE INVENTION

In the above-described target tracking system, it is difficult to dynamically control a threshold value under an environment in which the threshold value is variable by illuminance or peripheral light or for a subject of a color with an RGB ratio variable by a light source, such as a human skin color; therefore, the target may not be extracted by binarization processing, thereby causing a failure in target tracking.

It is desirable to provide an image processor, an imaging device, and an image processing system that enable an improvement in target extraction accuracy.

An image processor according to an embodiment of the present disclosure includes: a multiplier that receives image data from a pixel section including pixels of a plurality of colors and multiplies the image data by an adjustment parameter that adjusts a color level in each of the pixels; an adjuster that calculates a ratio of respective colors in each of the pixels in the image data and adjusts a value of the adjustment parameter on the basis of the ratio of the respective colors; and a binarization processor that extracts a target image of a specific color on the basis of the image data multiplied by the adjustment parameter.

An imaging device according to an embodiment of the present disclosure includes: a pixel section including pixels of a plurality of colors; a multiplier that receives image data from the pixel section and multiplies the image data by an adjustment parameter that adjusts a color level in each of the pixels; an adjuster that calculates a ratio of respective colors in each of the pixels in the image data and adjusts a value of the adjustment parameter on the basis of the ratio of the respective colors; and a binarization processor that extracts a target image of a specific color on the basis of the image data multiplied by the adjustment parameter.

An image processing system according to an embodiment of the present disclosure includes an imaging device and an actuator that causes the imaging device to perform shooting while tracking a target of a specific color, and the imaging device includes: a pixel section including pixels of a plurality of colors; a multiplier that receives image data from the pixel section and multiplies the image data by an adjustment parameter that adjusts a color level in each of the pixels; an adjuster that calculates a ratio of respective colors in each of the pixels in the image data and adjusts a value of the adjustment parameter on the basis of the ratio of the respective colors; and a binarization processor that extracts a target image of a specific color on the basis of the image data multiplied by the adjustment parameter.

In the image processor, the imaging device, or the image processing system according to the embodiment of the present disclosure, the ratio of the respective colors in each of the pixels in the image data is calculated, and the value of the adjustment parameter is adjusted on the basis of the ratio of the respective colors. The target image of the specific color is extracted on the basis of the image data having been multiplied by the adjustment parameter.

According to the image processor, the imaging device, or the image processing system according to the embodiment of the present disclosure, the target image of the specific color is extracted on the basis of the image data multiplied by the adjustment parameter, which makes it possible to improve target extraction accuracy.

It is to be noted that effects described here are not necessarily limited and may include any of effects described in the present disclosure.

BRIEF DESCRIPTION OF THE DRAWINGS

FIG. 1 is a configuration diagram schematically illustrating a configuration example of an image processing system according to a first embodiment of the present disclosure.

FIG. 2 is a configuration diagram schematically illustrating a configuration example of a binarization processor in the image processing system according to the first embodiment.

FIG. 3 is an explanatory diagram illustrating an outline of target tracking.

FIG. 4 is an explanatory diagram of binarization.

FIG. 5 is an explanatory diagram illustrating a calculation example of specific color extraction.

FIG. 6 is a configuration diagram schematically illustrating a configuration example of an image processing system according to a second embodiment.

FIG. 7 is an explanatory diagram schematically illustrating a principle of generation of flicker.

FIG. 8 is an explanatory diagram schematically illustrating a principle of occurrence of color rolling.

FIG. 9 is an explanatory diagram schematically illustrating a sampling cycle during high frame rate processing.

FIG. 10 is a block diagram depicting an example of schematic configuration of a vehicle control system.

FIG. 11 is a diagram of assistance in explaining an example of installation positions of an outside-vehicle information detecting section and an imaging section.

Some embodiments of the present disclosure are described in detail below with reference to the drawings. It is to be noted that description is given in the following order.

0. Comparative Example
1. First Embodiment (an image processing system that enables enhancement of target extraction accuracy) (FIGS. 1 to 5)
   1.1 Configuration of Image Processing System according to First Embodiment (FIGS. 1 and 2)
   1.2 Operation of Image Processing System according to First Embodiment (FIGS. 3 to 5)
   1.3 Effects
2. Second Embodiment (an image processing system that enables taking measures against flicker together with enhancement of target extraction accuracy) (FIGS. 6 to 9)
3. Application Examples (FIGS. 10 and 11)
4. Other Embodiments

0. COMPARATIVE EXAMPLE

An example of an image processing system according to a comparative example is a sensing system in which an image sensor and an image processing circuit are formed in one chip and various functions are achievable by a high-speed frame rate operation. For example, a target tracking system using a high frame rate typified by a Self Window method has been developed.

FIG. 3 illustrates an outline of target tracking. An example of the target tracking system is a system that tracks a moving object of a specific color as a target. Such a target tracking system includes an imaging device and an actuator that causes the imaging device to track and shoot a target of a specific color. For example, the actuator controls the imaging device to cause a target (a target image 30) moving in a screen to come to a center of a screen 30, as illustrated in FIG. 3.

In the target tracking system according to the comparative example, for example, a threshold value of a voltage is directly set for data from a sensor pixel, and binarization processing into "1" or "0" is executed depending on a level of the target image 20 to be extracted (refer to Japanese Unexamined Patent Application Publication No. H07-086936 and Japanese Unexamined Patent Application Publication No. H01-173269). The target tracking system according to the comparative example does not have a way to perform feedback on this threshold value setting from an image situation of a current frame or a past frame; therefore, tracking is not enabled in a case where a large change in a pixel level being subjected to target extraction is caused by a peripheral light source and a change in environment, which may cause a failure of target extraction, that is, an adverse effect, such as a failure of tracking of the target image 20, on achievement of functions.

Moreover, for example, in a camera that executes a high frame rate operation at about 1000 fps, flicker caused by an influence of a light source such as a fluorescent lamp is outputted not only in a screen but also in every frame while varying its brightness. As a technology of the comparative example, there is a system in which a cycle of this light source is detected and periodic brightness to be next generated of the light source is estimated to perform correction (refer to Japanese Unexamined Patent Application Publication No. 2003-189129, Japanese Unexamined Patent Application Publication No. 2015-115922, etc.). In recent years, it is difficult to estimate a blinking cycle in an environment in which a plurality of light sources are mixed by diversification of kinds of light sources, and it is difficult to perform periodic correction with respect to all light source environments.

Accordingly, in the present disclosure, it is desirable to provide a technology that enables the following.
(1) To execute robust binarization with respect to a change in environment upon execution of target extraction of a high-speed moving object at a high frame rate in a sensor structure having a parallel computing unit (either a column-parallel computing unit or a plane-parallel computing unit is applicable).
(2) To suppress brightness and a color change caused by flicker through promptly feeding back a change in periodic brightness of the light source by plane flicker or color rolling caused in high frame rate imaging.

1. FIRST EMBODIMENT

[1.1 Configuration of Image Processor according to First Embodiment]

FIG. 1 schematically illustrates a configuration example of an image processing system according to a first embodiment of the present disclosure. FIG. 2 schematically illustrates a configuration example of a binarization processor 5.

The image processing system according to the present embodiment includes a pixel section 1, an AD converter 2, a memory section 3, a color-specific multiplier 4, a binarization processor 5, an adjuster 40, a driving information generator 41, and an actuator 10.

The adjuster 40 includes a color-specific integrator 6 and a color adjustment ratio calculator 7. The binarization processor 5 includes a specific color extraction section 51 and a binarization output section 52, as illustrated in FIG. 2.

The driving information generator 41 generates information for driving of the actuator 10, and includes an image moment extraction section 8 and a gravity center calculator 9.

The image processing system according to the present embodiment includes an imaging device and the actuator 10 that causes the imaging device to perform shooting while tracking a target of a specific color, and may be a system that performs target tracking as illustrated in FIG. 3.

The imaging device may include the pixel section 1, the AD converter 2, the memory section 3, the color-specific multiplier 4, the binarization processor 5, the adjuster 40, and the driving information generator 41. Moreover, the pixel section 1 may serve as a component of the imaging device, and other circuit portions (the AD converter 2, the memory section 3, the color-specific multiplier 4, the binarization processor 5, the adjuster 40, and the driving information generator 41) may configure an image processor.

In the image processing system according to the present embodiment, at least the portions of the image processor may be formed in one chip. Alternatively, portions other than the actuator 10 may be formed in one chip.

The pixel section 1 may be a CMOS (Complementary MOS) image sensor. The pixel section 1 includes, for example, a light reception section and a color filter array. In the light reception section, a plurality of photoelectric converters are two-dimensionally arranged at predetermined intervals. The color filter array is disposed on a light incident surface of the light reception section. The pixel section 1 includes a CMOS (Complementary Metal-Oxide Semiconductor) image sensor. It is to be noted that FIG. 1 illustrates an example of a configuration in which three color pixels of R (red), G (green), and B (blue) are arranged in a Bayer array. In a case of the Bayer array, one pixel includes one R-color pixel, one B-color pixel, and two G-color pixels. Alternatively, the pixel section 1 may have an array different from the Bayer array.

The AD converter 2, the memory section 3, the color-specific multiplier 4, and the binarization processor 5 may be provided in column parallel.

Image data from the pixel section 1 in which one pixel includes color pixels of a plurality of colors is inputted to the color-specific multiplier 4 via the AD converter 2 and the memory section 3. The color-specific multiplier 4 has a function of multiplying the image data by an adjustment parameter that adjusts a color level in each pixel.

The adjuster 40 has a function of calculating a ratio of respective colors in each pixel in the image data and adjusting a value of the adjustment parameter on the basis of the ratio of the respective colors.

The binarization processor 5 has a function of extracting a target image 20 of a specific color on the basis of the image data having been multiplied by the adjustment parameter by the color-specific multiplier 4.

The specific color extraction section 51 compares color components in each pixel in the image data having been multiplied by the adjustment parameter to extract pixel data of the specific color.

The binarization output section 52 has a function of outputting, to the driving information generator 41, binarized image data obtained through performing binarization processing on the image data having been multiplied by the adjustment parameter. In the binarization processing, the pixel data of the specific color extracted by the specific color extraction section 51 is converted into 0, and pixel data other than the specific color is converted into 0.

The color-specific integrator 6 has a function of integrating image data in each pixel in a predetermined period (for example, in one frame period). The color-specific integrator 6 includes an RGB color-specific integrator that performs integration by each of the RGB colors, and a luminance calculator that calculates luminance Y.

The color adjustment ratio calculator 7 has a function of calculating a ratio of the respective colors in each pixel in the image data having been integrated by the color-specific integrator 6.

[1.2 Operation of Image Processor according to First Embodiment]

In the image processing system according to the present embodiment, image data in each column having been subjected to photoelectric conversion in the pixel section 1 is outputted to the AD converter 2. The AD converter 2 executes AD conversion in respective pixels in column parallel. The memory section 3 latches the image data having been subjected to AD conversion by the AD converter 2 in column parallel.

The color-specific multiplier 4 reads the image data latched by the memory section 3, multiplies the image data by an adjustment parameter corresponding to each color on a pixel-by-pixel basis, and outputs the multiplied image data to the specific color extraction section 51 of the binarization processor 5. It is to be noted that the adjustment parameter for multiplication by the color-specific multiplier 4 is obtained by calculation by the color adjustment ratio calculator 7 and is fed back to the color-specific multiplier 4.

In the specific color extraction section 51, a specific color extraction parameter is set for the specific color, and the pixel data of the specific color is extracted by the parameter from the image data having been multiplied by the adjustment parameter. Alternatively, in the specific color extraction section 51, a threshold value is set for each color level, and the pixel data of the specific color is extracted.

The binarization output section 52 outputs, to the driving information generator 41, binarized image data having been subjected to binarization processing in which the pixel data of the specific color extracted by the specific color extraction section 51 is converted into 1 and the pixel data other than the specific color is converted into 0, as illustrated in FIG. 4.

FIG. 5 illustrates a calculation example of specific color extraction.

It is to be noted that FIG. 5 illustrates color space corresponding to an HSV model. The HSV model is a color space model including three components, that is, hue (Hue), Saturation (Saturation•Chroma), and lightness (Value •Lightness •Brightness).

FIG. 5 illustrates an example (1) in which pixel data of the specific color is extracted and detected with use of R as a reference color (skin color detection), an example (2) in which pixel data of the specific color is extracted and detected with use of G as a reference color, and an example (3) in which pixel data of the specific color is extracted and detected with use of B as a reference color.

In the calculation example in FIG. 5, $\alpha$, $\beta$, and $\gamma$ are coefficients that decide a threshold value determining whether pixel data is pixel data of the specific color or pixel data other than the specific color in the binarization output section 52. A non-basic color ratio threshold value and a basic color ratio absolute threshold value are inputted to the binarization output section 52. The basic color is a color corresponding to the specific color.

A moment, a gravity center, etc. of the binarized image data outputted from the binarization output section 52 are calculated in the driving information generator 41 (the image moment extraction section 8 and the gravity center calculator 9) to generate information for driving of the actuator 10.

In contrast, in the color-specific integrator 6, the image data latched by the memory section 3 in a predetermined period (for example, in one frame period) is integrated in each pixel by each of the colors. The color-specific integrator 6 integrates image data of an entire screen by each color of R, G, and B.

The color adjustment ratio calculator 7 calculates a ratio of R, G, and B from integration results of R, G, and B, and adjusts (feeds back) the value of the adjustment parameter for multiplication by the color-specific multiplier 4 on the basis of the ratio of the respective colors. The color adjustment ratio calculator 7 calculates white balance to allow R:G:B to be a ratio of 1:1:1, and reflects the white balance to the value of the adjustment parameter of the color-specific multiplier 4.

Moreover, in the color-specific integrator 6, the luminance Y in each pixel is calculated by each color of R, G, and B on the basis of the image data latched by the memory section 3. In the color-specific integrator 6, the luminance Y is calculated by a typical calculation expression, for example, "$Y=0.30R+0.59G+0.11B$", or the like, and the luminance Y in a predetermined period (for example, in one frame period) is integrated. This integration may be performed, for example, in a target region around the gravity center calculated by the gravity center calculator 9 or in the entire screen. In order to cause a result of integration of the luminance Y to be an appropriate level, the color adjustment ratio calculator 7 may calculate (adjust) an autoexposure (AE) level and reflect the autoexposure level to an accumulation time (shutter) in each pixel of the pixel section 1 or to the color-specific multiplier 4.

The above processing may be executed in each frame.

[1.3 Effects]

As described above, according to the present embodiment, the target image 20 of the specific color is extracted on the basis of the image data having been multiplied by the adjustment parameter, which makes it possible to improve target extraction accuracy.

According to the image processing system according to the present embodiment, accuracy of extraction of the target image 20 is improved, thereby resulting in an improvement in object tracking accuracy. According to the image processing system according to the present embodiment, a failure of subject tracking caused by a change in a peripheral environment is suppressed.

Moreover, according to the image processing system according to the present embodiment, it is possible to suppress changes in brightness and colors of an image generated on the entire screen in each frame in a high-speed frame rate camera. This holds promise of improving image quality performance.

It is to be noted that the effects described in the description are merely illustrative and non-limiting, and other effects may be included. This applies to effects achieved by the following other embodiments.

2. SECOND EMBODIMENT

Next, description is given of an image processing system according to a second embodiment of the present disclosure. It is to be noted that components substantially same as those of the image processing system according to the foregoing first embodiment are denoted by same reference numerals, and description thereof is omitted as appropriate.

FIG. 6 schematically illustrates a configuration example of the image processing system according to the second embodiment of the present disclosure.

In the present embodiment, there is provided an image processing system that enables taking measures against flicker together with enhancement of target extraction accuracy.

The image processing system according to the present embodiment further includes an image I/F (interface) 11 and an external device 10 in the configuration of the image processing system according to the foregoing first embodiment.

The external device 12 may be another image processor or an image output device such as a display.

In the image processing system according to the present embodiment, an output from the color-specific integrator 4 is inputted to the color-specific integrator 6 and the image I/F 11.

FIG. 7 illustrates an image of flicker generation. FIG. 7 illustrates a cycle of a power source, a blinking cycle of a fluorescent lamp, and a vertical synchronization signal VD. This also applies to the following FIGS. 8 and 9.

As illustrated in FIG. 7, in a case where the frame rate is slow, brightness differs in each frame, thereby causing flicker. In order to suppress flicker, a frame rate operation suitable for the cycle of the fluorescent lamp is necessary.

FIG. 8 illustrates an image of occurrence of color rolling. A difference in a ratio of color components in each frame causes color rolling.

In the image processing system according to the present embodiment, it is possible to perform, in each frame, an operation of feeding back an output from the color adjustment ratio calculator 7 to the color-specific multiplier 4. This makes it possible to perform auto white balance (AWB) operation and an AE operation at a high frame rate.

FIG. 9 illustrates an example of a sampling cycle during shooting at a high frame rate.

As illustrated in FIG. 9, performing the AE operation corresponding to sampled brightness in each frame at a high frame rate makes it possible to nearly eliminate an influence of flicker illustrated in FIG. 7. This makes it possible to suppress generation of flicker in the image data to be outputted to the external device 12.

Moreover, regarding color rolling illustrated in FIG. 8, performing the AWB operation in each frame at a high frame rate makes it possible to minimize an influence of color rolling. This makes it possible to suppress occurrence of color rolling in image data to be outputted to the external device 12.

Other configurations, operations, and effects may be substantially similar to those in the image processing system according to the foregoing first embodiment.

3. APPLICATION EXAMPLES

The technology according to the present disclosure is applicable to various products. For example, the technology according to the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, an unmanned aerial vehicle, a vessel, a robot, a construction machine, an agricultural machine (a tractor), etc.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 11 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the image processor, the imaging device, and the image processing system according to the present disclosure is applicable to, for example, the outside-vehicle information detecting unit 7400 and the imaging section 7410 or the in-vehicle information detecting unit 7500 and the driver state detecting section 7510.

4. OTHER EMBODIMENTS

The technology achieved by present disclosure is not limited to description of the foregoing respective embodiments, and may be modified in a variety of ways.

For example, in the foregoing respective embodiments, the target tracking system is exemplified as an example of the image processing system; however, the present technology is widely applicable to other sensing systems using binarized image data.

The present technology may have the following configurations, for example.

(1)
An image processor, including:
a multiplier that receives image data from a pixel section including pixels of a plurality of colors and multiplies the image data by an adjustment parameter that adjusts a color level in each of the pixels;
an adjuster that calculates a ratio of respective colors in each of the pixels in the image data and adjusts a value of the adjustment parameter on the basis of the ratio of the respective colors; and
a binarization processor that extracts a target image of a specific color on the basis of the image data multiplied by the adjustment parameter.

(2)
The image processor according to (1), in which the binarization processor includes a specific color extraction section that compares color components in each of the pixels in the image data multiplied by the adjustment parameter and extracts pixel data of the specific color.

(3)
The image processor according to (2), in which the binarization processor further includes a binarization output section that outputs binarized image data obtained through performing binarization processing on the image data multiplied by the adjustment parameter, the binarization processing in which the pixel data of the specific color extracted by the specific color extraction section is converted into 1 and pixel data other than the specific color is converted into 0.

(4)
The image processor according to (3), further including a driving information generator that generates, on the basis of the binarized image data, information for driving of an actuator that tracks a target of the specific color.

(5)
The image processor according to any one of (1) to (4), in which
the adjuster includes
an integrator that integrates the image data in each of the pixels in a predetermined period, and
a color adjustment ratio calculator that calculates the ratio of the respective colors in each of the pixels in the integrated image data.

(6)
An imaging device, including:
a pixel section including pixels of a plurality of colors;
a multiplier that receives image data from the pixel section and multiplies the image data by an adjustment parameter that adjusts a color level in each of the pixels;
an adjuster that calculates a ratio of respective colors in each of the pixels in the image data and adjusts a value of the adjustment parameter on the basis of the ratio of the respective colors; and
a binarization processor that extracts a target image of a specific color on the basis of the image data multiplied by the adjustment parameter.

(7)
An image processing system provided with an imaging device and an actuator that causes the imaging device to perform shooting while tracking a target of a specific color, the imaging device including:
a pixel section including pixels of a plurality of colors;
a multiplier that receives image data from the pixel section and multiplies the image data by an adjustment parameter that adjusts a color level in each of the pixels;
an adjustor that calculates a ratio of each of the colors in each of the pixels in the image data and adjusts a value of the adjustment parameter on the basis of the ratio of each of the colors; and
a binarization processor that extracts target image of a specific color on the basis of the image data multiplied by the adjustment parameter.

This application claims the benefit of Japanese Priority Patent Application No. 2016-120965 filed with the Japan Patent Office on Jun. 17, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processor, comprising:
processing circuitry configured to:
receive image data from a pixel section including pixels of a plurality of colors and integrate the received image data of each of the plurality of colors in each of the pixels in a predetermined period;
calculate a ratio of respective colors in each pixel of the integrated image data to provide an adjustment parameter;
multiply the image data by the adjustment parameter on a pixel-by-pixel basis to provide adjusted image data;
extract pixel data of a specific color from the adjusted image data, wherein extracting pixel data of the specific color from the adjusted image data includes comparing, for each pixel, a value of the specific color to at least one absolute threshold and to at least one threshold based on a value of a color other than the specific color;
binarize the extracted pixel data to provide binarized image data in which image data of the specific color has a first binary value and image data of colors other than the specific color has a second binary value; and
use the binarized image data as a basis to drive an actuator that causes the pixel section to track a target of the specific color.

2. The image processor according to claim 1, wherein the processing circuitry is configured to compare color components in each of the pixels in the image data multiplied by the adjustment parameter and to extract pixel data of the specific color.

3. The image processor according to claim 1, wherein the processing circuitry is configured to generate, on a basis of the binarized image data, information for driving of an actuator that tracks a target of the specific color.

4. An imaging device, comprising:
a pixel section including pixels of a plurality of colors; and
processing circuitry configured to:
receive image data from the pixel section and integrate the received image data of each of the plurality of colors in each of the pixels in a predetermined period;
calculate a ratio of respective colors in each pixel of the integrated image data to provide an adjustment parameter;
multiply the image data by the adjustment parameter on a pixel-by-pixel basis to provide adjusted image data;
extract pixel data of a specific color from the adjusted image data, wherein extracting pixel data of the specific color from the adjusted image data includes comparing, for each pixel, a value of the specific color to at least one absolute threshold and to at least one threshold based on a value of a color other than the specific color;

binarize the extracted pixel data to provide binarized image data in which image data of the specific color has a first binary value and image data of colors other than the specific color has a second binary value; and use the binarized image data as a basis to drive an actuator that causes the pixel section to track a target of the specific color.

5. An image processing system provided with an imaging device and an actuator that causes the imaging device to perform shooting while tracking a target of a specific color, the imaging device comprising:

a pixel section including pixels of a plurality of colors; and processing circuitry configured to:

receive image data from the pixel section and integrate the received image data of each of the plurality of colors in each of the pixels in a predetermined period;

calculate a ratio of respective colors in each pixel of the integrated image data to provide an adjustment parameter;

multiply the image data by the adjustment parameter on a pixel-by-pixel basis to provide adjusted image data;

extract pixel data of the specific color from the adjusted image data, wherein extracting pixel data of the specific color from the adjusted image data includes comparing, for each pixel, a value of the specific color to at least one absolute threshold and to at least one threshold based on a value of a color other than the specific color;

binarize the extracted pixel data to provide binarized image data in which image data of the specific color has a first binary value and image data of colors other than the specific color has a second binary value; and use the binarized image data as a basis to drive the actuator to cause the pixel section to track the target of the specific color.

* * * * *